United States Patent
Matsuura et al.

(10) Patent No.: US 6,876,892 B2
(45) Date of Patent: Apr. 5, 2005

(54) REWRITING SYSTEM FOR VEHICLE CONTROLLER

(75) Inventors: Masanori Matsuura, Wako (JP); Naohiko Mizuo, Wako (JP); Tetsuya Yashiki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 578 days.

(21) Appl. No.: 09/835,009

(22) Filed: Apr. 13, 2001

(65) Prior Publication Data

US 2001/0049765 A1 Dec. 6, 2001

(30) Foreign Application Priority Data

Apr. 13, 2000 (JP) ........................................ 2000-112126

(51) Int. Cl.⁷ .............................................. G06F 19/00
(52) U.S. Cl. .................... 700/90; 365/185.05; 365/191; 711/103; 711/170
(58) Field of Search ........................... 365/185.05, 191; 700/90; 711/103, 170

(56) References Cited

U.S. PATENT DOCUMENTS

| | | | |
|---|---|---|---|
| 5,243,576 A * | 9/1993 | Ishikawa ..................... | 365/222 |
| 5,523,948 A | 6/1996 | Adrain ................... | 364/431.01 |
| 6,044,014 A | 3/2000 | Komori et al. ......... | 365/185.04 |
| 6,205,580 B1 * | 3/2001 | Hirose ......................... | 717/162 |
| 6,256,226 B1 * | 7/2001 | Fujita ..................... | 356/185.05 |
| 6,389,353 B2 * | 5/2002 | Kondo ........................ | 701/114 |
| 6,405,279 B1 * | 6/2002 | Kondo et al. ............... | 711/103 |
| 2001/0049765 A1 * | 12/2001 | Matsuura et al. ........... | 711/103 |

FOREIGN PATENT DOCUMENTS

| | | |
|---|---|---|
| DE | 19642737 A1 | 10/1997 |
| DE | 19850133 A1 | 5/1999 |
| DE | 19943100 A1 | 4/2000 |
| EP | 941910 A1 | 9/1999 |
| JP | 63-223901 | 9/1988 |
| JP | 3-238541 | 10/1991 |
| JP | 2000-89822 A | 3/2000 |

* cited by examiner

*Primary Examiner*—Leo Picard
*Assistant Examiner*—Michael D. Masinick
(74) *Attorney, Agent, or Firm*—Anthony A. Laurentano; Lahive & Cockfield, LLP (57) ABSTRACT

The rewriting system for rewriting data stored in a memory of a vehicle controller with new data is provided. The rewriting device is capable of communicating with the vehicle controller. The rewriting device enters a waiting state in which there is no exchange of message between the vehicle controller and the rewriting device. The rewriting device is in a waiting state until a predetermined waiting time has elapsed from the time at which a signal for requesting the vehicle controller to delete the data or write the new data is sent, or from the time at which a signal indicative of start of deleting operation of the data or writing operation of the new data is received. Thus, an erroneous determination of offline due to a busy state of the vehicle controller caused by deleting or writing operation is avoided. It is preferable that the predetermined waiting time for deleting operation is the time necessary to delete the data stored in the memory and the predetermined waiting time for writing operation is the time necessary to write the new data into the memory. This enables the waiting time to be optimized in accordance with the specification of the memory.

9 Claims, 8 Drawing Sheets

REWRITING SYSTEM FOR VEHICLE CONTROLLER

FIELD OF THE INVENTION

The present invention relates to a system for rewriting a program or data stored in a memory of a vehicle controller with other program or data transferred from an external rewriting device.

BACKGROUND OF THE INVENTION

Vehicles are subjected to various types of control by an electronic control unit (hereafter referred to as "ECU"). Such control includes engine-related control of an air fuel ratio, fuel injection amount, and emission as well as body-related control for a power window, an air bag, and an ABS. The ECU provides various types of control for the vehicle based on current conditions and traveling conditions of the vehicle sensed by various sensors mounted on the vehicle.

The ECU comprises a central processing unit (CPU), a ROM (Read Only Memory) that stores programs and data to be executed, a RAM (Random Access Memory) which provides a work area for execution and which stores results of computation, and an I/O interface for receiving signals from various sensors and transmitting control signals to various parts of the engine.

A system wherein a rewritable and non-volatile memory, such as a flash memory, an EEPROM, or an EPROM, is used as the ROM to allow a program or data to be rewritten through serial communication is known. Such a system typically comprises a rewriting device, an ECU and a serial communication path connecting them together. Rewriting is achieved by deleting data stored in the rewritable memory mounted on the ECU and writing new data transferred from the rewriting device via serial communication into the memory. By way of example, Japanese Patent Application Laid-Open No. 63-223901 describes a method for changing a program stored in the EEPROM of the ECU in response to a request from an external device via a SCI (Serial Communication Interface) terminal with the ECU being mounted on the vehicle.

Generally, deleting and writing operation on a non-volatile memory such as a flash memory and EEPROM requires a relatively large amount of time. The ECU may be busy during deleting or writing operation. As a result, the ECU may not be able to respond to the rewriting device. When there is no response from the ECU for a predetermined period, the rewriting device determines that communication between the ECU and the rewriting device is offline.

Figure 5:
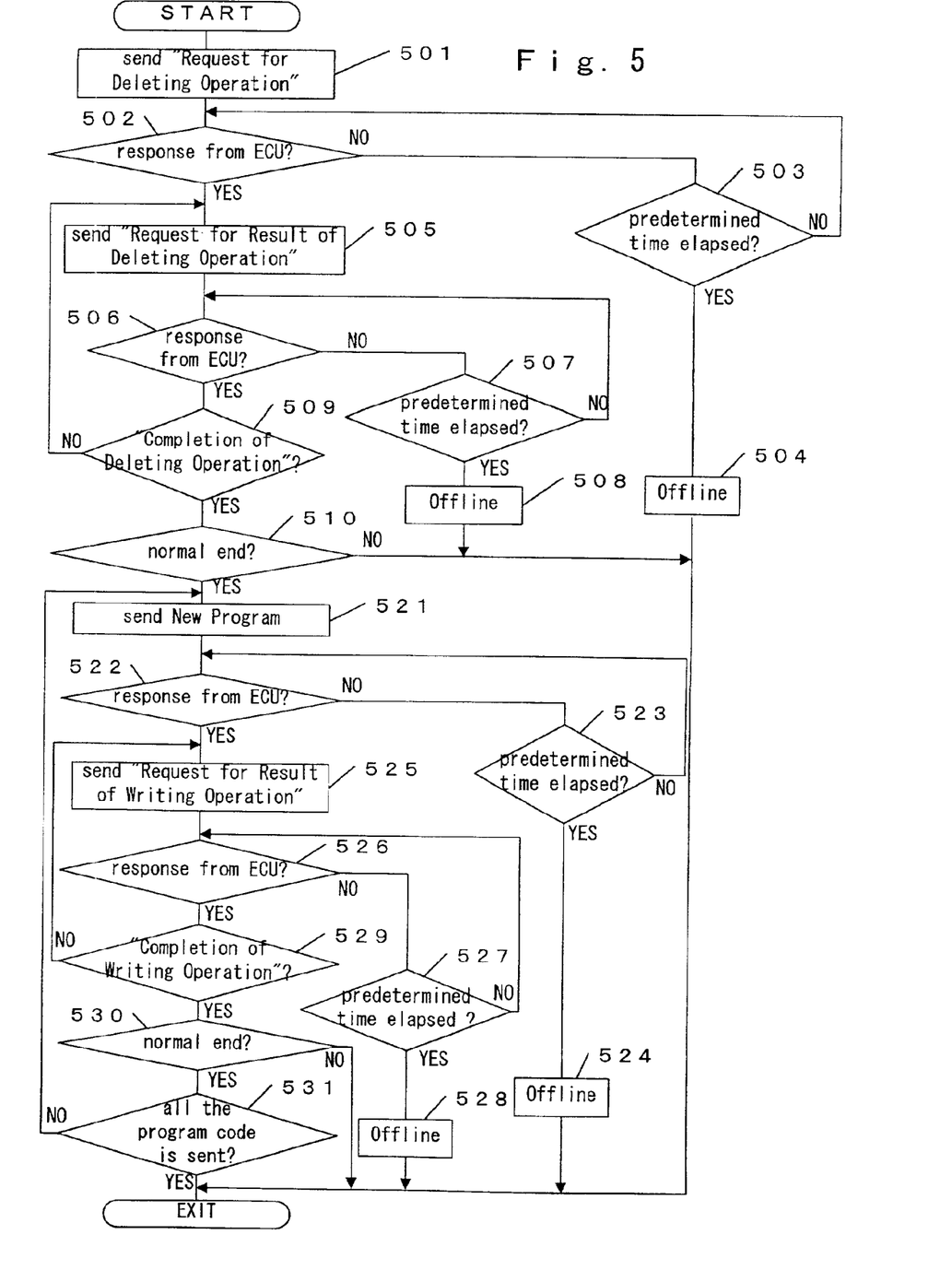
FIG. 5 is a flow chart showing conventional deleting and writing operation in a rewriting device.
Figure 6:
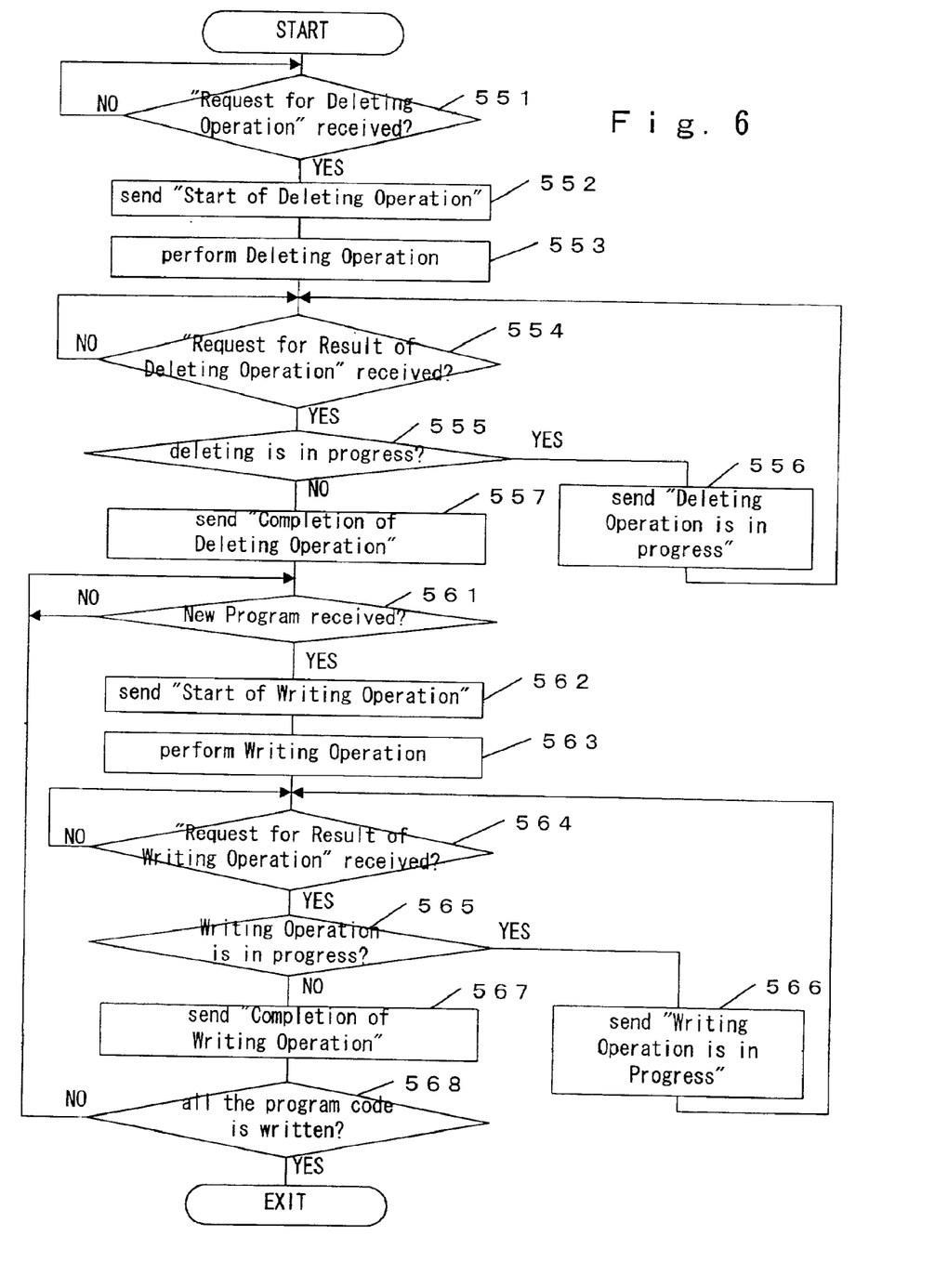
FIG. 6 is a flow chart showing conventional deleting and writing operation in a vehicle controller.

FIGS. 5 and 6 show a typical method for rewriting a program stored in a memory of the ECU. FIG. 5 is a flow chart showing the process performed by the rewriting device, and FIG. 6 is a flow chart showing the process performed by the ECU.

In response to a request for deleting operation from the rewriting device (501), the ECU sends a signal to the rewriting device indicative of start of deleting operation (552) and deletes a program stored in a memory of the ECU (553). In response to the signal indicative of start of deleting operation, the rewriting device requests the result of the deleting operation (505). If the deleting operation has not been completed, the ECU sends a signal to the rewriting device indicating that the deleting operation is in progress (556). If the deleting operation has been completed, the ECU sends a signal indicative of completion of the deleting operation (557).

Similarly, writing operation is carried out. In response to a request for writing operation from the rewriting device (521), the ECU sends a signal to the rewriting device indicative of start of writing operation (562) and writes a new program to the memory of the ECU (563). In response to the signal indicative of start of writing operation, the rewriting device requests the result of the writing operation (525). If the writing operation has not been completed, the ECU sends a signal to the rewriting device indicating that the writing operation is in progress (566). If the writing operation has been completed, the ECU sends a signal indicative of completion of the writing operation (567).

At step 509 or 529, if the response from the ECU indicates that the deleting or writing operation is in progress, the process returns to step 505 or 525. If the response from the ECU indicates that the deleting or writing operation has been completed, the process proceeds to the following step 510 or 530. In this way, the rewriting device determines whether deleting or writing operation is being performed or has been completed by sending a request for the result of the deleting or writing operation and by receiving a response to the request. Even if the deleting or writing operation is being performed, an erroneous determination of offline is not made as long as there is a response from the ECU.

Figure 7:
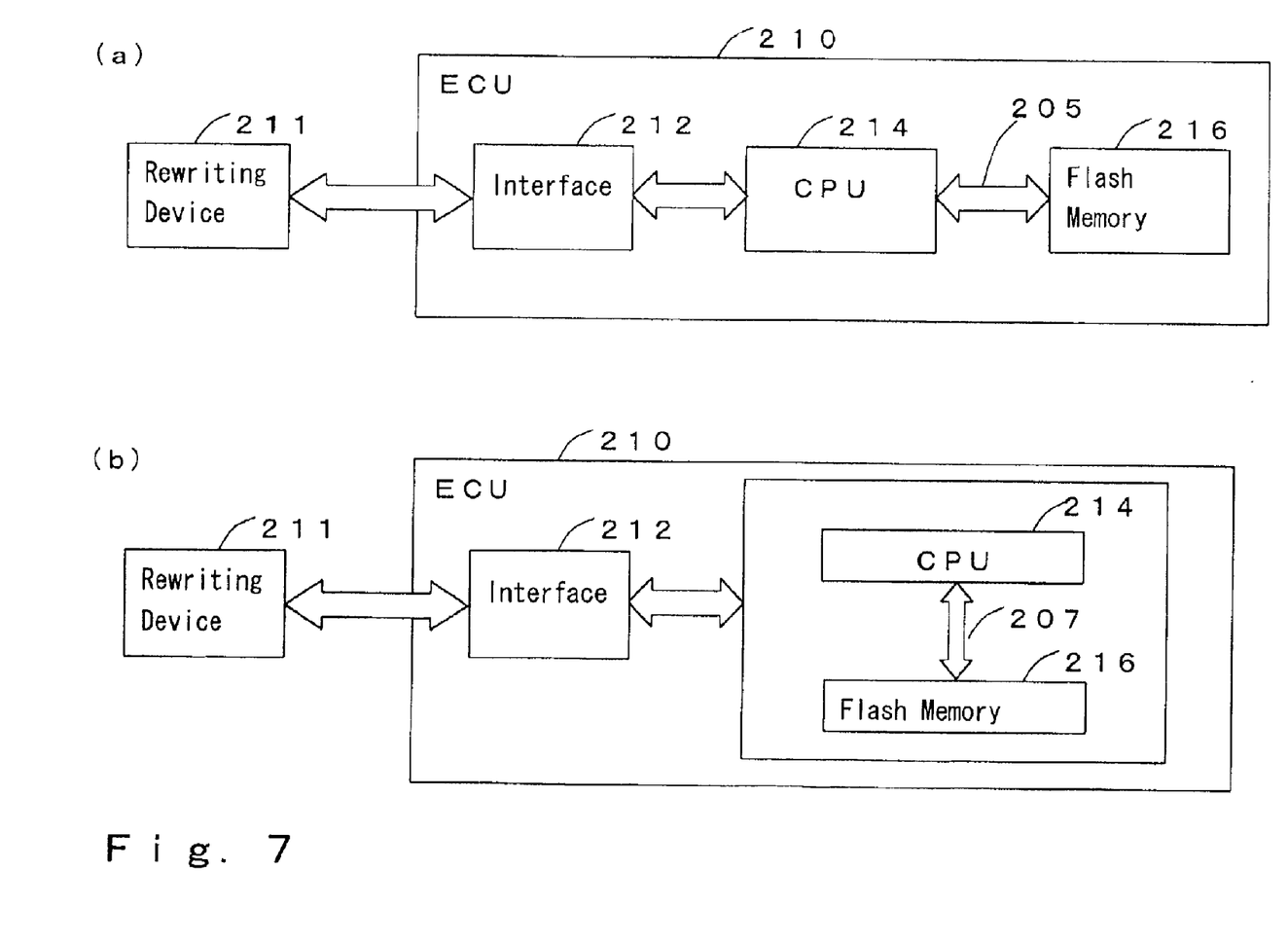
FIG. 7 shows a typical form of a CPU and a memory in a vehicle controller.

FIG. 7 shows typical two forms of a non-volatile memory mounted on the ECU. FIG. 7A shows a form in which a flash memory 216, which is a non-volatile memory, is provided independently of a CPU 214. In other words, the flash memory 216 is mounted on a chip different from the CPU 214. The flash memory 216 is coupled to a chip of a microcomputer where the CPU is mounted via an external bus 205. When the ECU 210 receives a request for deleting or writing operation on the flash memory 216 from the rewriting device 211, the operation is performed by an input/output controller (not shown) that controls input/output through the external bus 205. In this way, since delete or write control on the flash memory 216 is performed independently of the CPU, the CPU does not become busy during deleting or writing operation.

FIG. 7B shows another form in which the flash memory 216 and the CPU 214 are provided on a single chip to constitute one chip microcomputer. The flash memory 216 is coupled to the CPU 214 via an internal bus 207. Deleting or writing operation is performed by an interface means incorporated in the CPU 214 as a function. In this case, the CPU may become busy during deleting or writing operation. When the CPU is busy, the ECU 210 may be unable to communicate with the rewriting device 211.

Recently, in order to reduce costs relating to the ECU, a microcomputer including a non-volatile memory, as shown in FIG. 7B, has been increasingly employed. As described above, in this form, a CPU may become busy during deleting or writing operation on a non-volatile memory. When the ECU is busy, it may not respond to a request for the result of deleting or writing operation from the rewriting device. As a result, even though communication between the ECU and the rewriting device is normal, the rewriting device may determine that the communication is offline if a response from the ECU have not been received in a predetermined period. Thus, when the CPU of the ECU is busy, the rewriting device may made an erroneous determination of offline.

SUMMARY OF THE INVENTION

It is an object of the invention to provide a rewriting system capable of avoiding an erroneous determination of offline when deleting or writing operation on a non-volatile memory is being performed in the ECU.

It is another object of the invention to provide a rewriting system improving the efficiency of rewriting.

According to one aspect of the invention, a rewriting device for rewriting data stored in a memory of a vehicle controller with new data is provided. The rewriting device is capable of communicating with the vehicle controller. In one embodiment, the rewriting device is connected to the vehicle controller via serial communication. The rewriting device sends a signal to the vehicle controller indicative of a request for deleting operation of the data or writing operation of the new data. In response to the request, the vehicle controller sends a signal to the rewriting device indicative of start of deleting or writing operation and performs the deleting or writing operation, respectively. The rewriting device enters a waiting state when the request signal is sent or when the start signal is received. The rewriting device waits until a predetermined waiting time elapses. For the waiting time, there is no exchange of message between the vehicle controller and the rewriting device. When the waiting time has elapsed, the rewriting device sends a signal to the vehicle controller indicative of a request for the result of the deleting or writing operation. Since the rewriting device is in a waiting state when deleting or writing operation is being performed, an erroneous determination of offline due to a busy state of the CPU in the vehicle controller can be avoided.

According to one embodiment of the invention, the predetermined waiting time for deleting operation is the time necessary to delete the data store in the memory. Similarly, the predetermined waiting time for writing operation is the time necessary to write the new data into the memory. The deleting time and writing time depend on the specification of the memory. Thus, the waiting time is optimized in accordance with the specification of the memory.

According to another embodiment of the invention, the deleting time is calculated based on the size of the data and the specification of the memory, and the writing time is calculated based on the size of the new data and the specification of the memory. The calculation is implemented in the vehicle controller.

According to another embodiment of the invention, the rewriting device acquires the deleting time from the vehicle controller and sets it in the waiting time for deleting operation. Similarly, the rewriting device acquires the writing time from the vehicle controller and sets it in the waiting time for writing operation. This enables the waiting time to be minimized, thus the efficiency of rewriting being improved.

DETAILED DESCRIPTION OF THE PREFERRED EMBODIMENTS

A system for rewriting a program stored in a non-volatile memory of a vehicle controller will be described referring to attached drawings. The present invention, however, is not limited to the system but is applicable to various systems for rewriting data stored in a memory.

Figure 1:
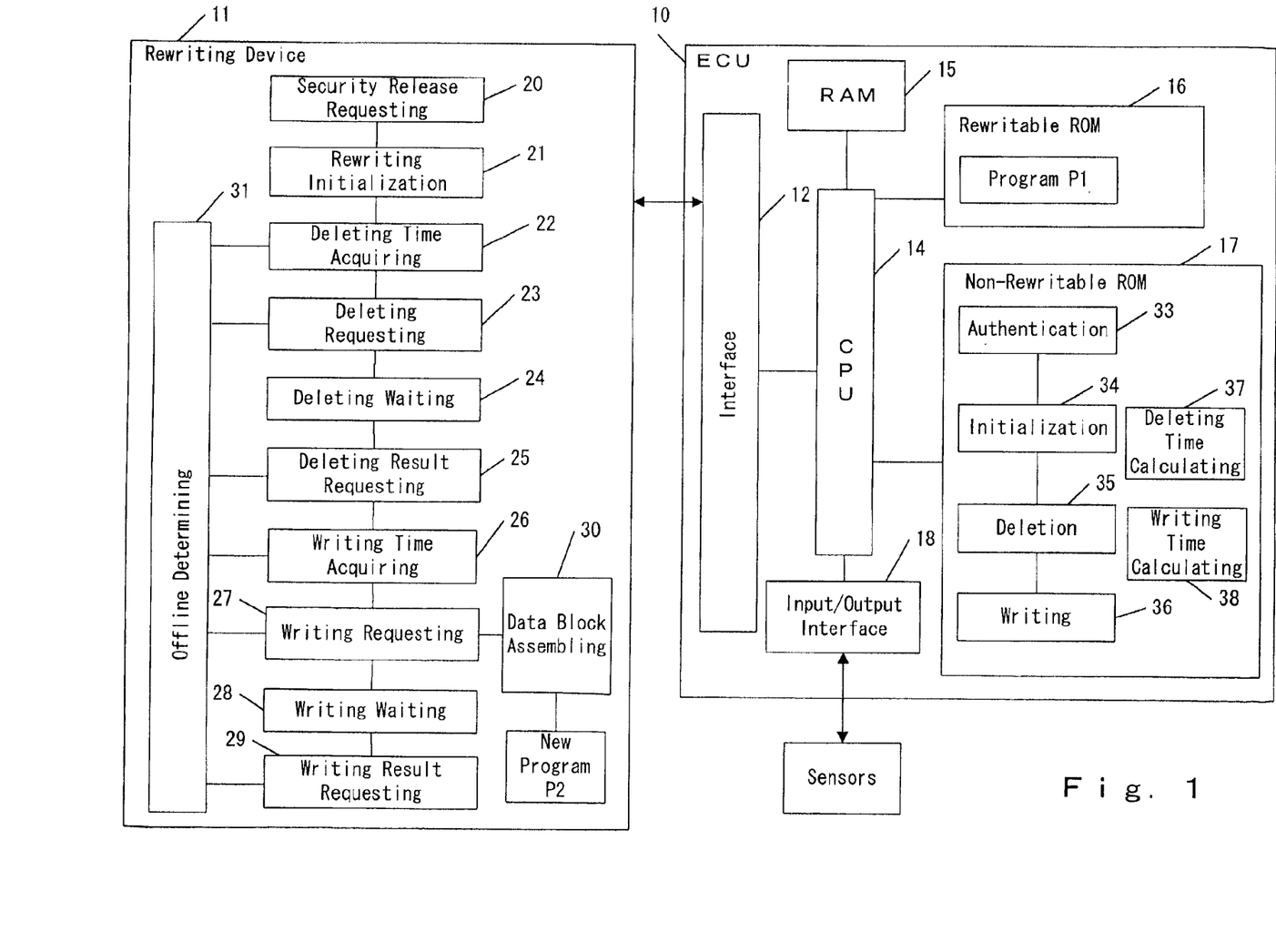
FIG. 1 is a block diagram showing functional blocks of a rewriting system in one embodiment of the invention.

FIG. 1 shows a general functional block diagram of a rewriting system according to the invention. The rewriting system comprises an ECU 10 and a rewriting device 11. The rewriting device 11 is a rewriting device authorized by a manufacturer of vehicles on which the ECU 10 is mounted. By connecting the rewriting device 11 to the ECU 10 via a serial communication bus and operating the rewriting device 11, security for preventing a program or data stored in the ROM 16 of the ECU 10 from being rewritten without proper authorization is released. Thus, the rewriting device 11 is allowed to rewrite a program or data stored in the ROM 16.

The ECU 10 comprises a central processing unit 14 (hereafter referred to as a "CPU") including a microcomputer and associated circuit elements, ROMs 16 and 17 which are non-volatile memories and which store programs and data, a RAM 15 (Random Access Memory) which provides a work area for execution and which stores results of computations, and an I/O interface 18 for receiving signals from various sensors 19 and transmitting control signals to various parts of the engine.

Signals from various sensors 39 include an engine rotation speed (Ne), an engine water temperature (Tw), an intake air temperature (Ta), a battery voltage (VB), and an ignition switch (IGSW). Thus, based on a signal input from the I/O interface 18, the CPU 14 invokes a control program and data from the ROMs 16 and 17 to execute computations, and outputs the results to various parts of the vehicle via the I/O interface 18 to control various functions of the vehicle.

The ECU 10 also comprises an interface 12. The interface 12 has a protocol for communication with the rewriting device 11 to enable serial communication between the ECU 10 and the rewriting device 11.

The rewritable ROM 16 is a non-volatile memory from which stored data can be deleted and to which new data can be written. The rewritable ROM 16 can be, for example, a flash memory or an EEPROM. The non-rewritable ROM 17 is a non-volatile memory. The non-rewritable ROM 17 can be implemented by specifying a part of the memory area of a rewritable ROM as an unchangeable area, or by using a mask ROM for which data is fixed during manufacturing and from or to which data can subsequently not be deleted or written. Alternatively, the ROM 17 can be implemented with a PROM to which data can be written only once.

The ROMs 16 and 17 can be implemented as two memories that are physically separated. Alternatively, the memory area of a single memory may be divided into two areas so that one of the areas is used as a rewritable area, while the other is used as a non-rewritable area. For example, after a non-rewritable area in which a program or the like is stored has been specified in the EEPROM, a rewritable area is specified with start and end addresses in the unfilled space of the memory.

A program P1, which is to be rewritten by the rewriting device 11, is stored in the rewritable ROM 16. Programs that implement an authentication part 33, an initialization part 34, a deleting part 35 and a writing part 36 are stored in the non-rewritable ROM 17. The authentication part 33 judges whether the rewriting device 11 is authentic. If it is judged that the rewriting device is authentic, the authentication part 33 releases the security that prevents data stored in the ROM 16 from being changed without proper authorization.

The initialization part 34 performs an initialization process for starting deleting and writing operation. The deleting part 35 deletes the program P1. The writing part 36 serially receives data blocks representative of a new program P2 from the rewriting device 11. The data blocks are assembled from program code of the new program P2. The writing part 36 writes a partial program code included in each data block into the ROM 16.

The rewriting device 11 comprises a security release requesting part 20, a rewriting initialization part 21, a deleting requesting part 23, a deleting waiting part 24, and a deleting result requesting part 25, which are stored in a memory of the rewriting device 11 as programs. The security release requesting part 20 requests the ECU 10 to release the security so that rewriting to the rewritable ROM 16 of the ECU 10 is permitted. The rewriting initialization part 21 performs an initialization process for starting deleting and writing operation. The deleting requesting part 23 requests the ECU 10 to delete the program P1 in the ROM 16.

The deleting waiting part 24 waits until a predetermined waiting time DT2 has elapsed from the time at which deleting operation is started in the ECU 10. For the waiting time DT2, the rewriting device 11 exchanges no message with the ECU 10. In other words, the rewriting device 11 is in a waiting state when deleting operation is being performed in the ECU 10. Thus, an erroneous determination of offline due to a busy state of the ECU 10 can be avoided. When the waiting time DT2 has elapsed, the deleting result requesting part 25 requests the result of the deleting operation to determine whether the deleting operation is in progress or has been completed.

The rewriting device 11 also comprises a writing requesting part 27, a writing waiting part 28, a writing result requesting part 29 and a data block assembling part 30, which are stored in a memory as programs. The data block assembling part 30 assembles data blocks from the new program P2. Each data block includes a program code field for a partial program code of the new program P2 and an address field for a leading address of the ROM 16 in which the partial program code is to be stored. For example, each partial program code has a length of eight bits. The data blocks assembled are serially sent to the ECU 10 via serial communication by the writing requesting part 27.

The writing requesting part 27 requests the ECU 10 to write a partial program code of each data block in an address of the ROM 16 that is indicated by an address value in the address field of each data block.

The writing waiting part 28 waits until a predetermined waiting time WT2 has elapsed from the time at which writing operation is started in the ECU 10. For the waiting time WT2, the rewriting device 11 exchanges no message with the ECU 10. In other words, the rewriting device 11 is in a waiting state when writing operation is being performed in the ECU 10. Thus, an erroneous determination of offline due to a busy state of the ECU 10 can be avoided. When the waiting time WT2 has elapsed, the writing result requesting part 29 requests the result of the writing operation to determine whether the writing operation is in progress or has been completed.

The ECU 10 also comprises a deleting time calculating part 37 and a writing time calculating part 38. The deleting time calculating part 37 calculates the time DT necessary to delete the program P1. A unit time of deletion, which can be expressed, for example, in blocks or bytes, depends on the type of the ROM 16. That is, a unit time of deletion is predetermined in accordance with the specification of the ROM 16. The deleting time calculating part 37 calculates the deleting time DT based on the size of the program P1 and a unit time of deletion specific to the ROM 16.

The writing time calculating part 38 calculates the time WT necessary to write a partial program code of the new program P2 received from the rewriting device 11. As is the case for deletion, a unit time of writing depends on the type of the ROM 16, and is predetermined in accordance with the specification of the ROM 16. The writing time calculating part 38 calculates the writing time WT based on the size of a partial program code of the program P2 and a unit time of writing specific to the ROM 16. In this way, the writing time WT is calculated in accordance with the amount of data written into the ROM 16 at a time by the writing part 36.

In another embodiment, the deleting and writing time calculating parts 37 and 38 may be provided in the rewriting device 11. The rewriting device 11 may have a unit time of deletion and writing specific to the ROM 16 in advance. Alternatively, the rewriting device 11 may request a unit time of deletion and writing from the ECU 10. Thus, the deleting time DT and the writing time WT are calculated in the rewriting device 11.

The rewriting device 11 preferably comprises a deleting time acquiring part 22 and a writing time acquiring part 26. Before or when the deleting requesting part 23 requests the ECU 10 to delete the program P1, the deleting time acquiring part 22 acquires from the ECU 10 the deleting time DT calculated by the deleting time calculating part 37. The deleting time acquiring part 22 sets the acquired deleting time DT in the waiting time DT2. Thus, the rewriting device 11 waits until the deleting time DT has elapsed from the time at which deleting operation is started. This enables the waiting time for deleting operation to be optimized in accordance with the specification of the ROM 16, thus the efficiency of deleting operation being improved.

Similarly, before or when the writing requesting part 27 requests the ECU 10 to write a partial program code of the new program P2, the writing time requesting part 26 acquires from the ECU 10 the writing time WT calculated by the writing time calculating part 38. The writing time acquiring part 26 sets the acquired writing time WT in the waiting time WT2. Thus, the rewriting device 11 waits until the writing time WT has elapsed from the time at which writing operation is started. This enables the waiting time for writing operation to be optimized in accordance with the specification of the ROM 16, thus the efficiency of writing operation being improved. Alternatively, the waiting time DT2 and WT2 may be predetermined as fixed values, respectively.

The rewriting device 11 also comprises an offline determining part 31. The offline determining part 31 judges whether communication between the rewriting device 11 and the ECU 10 is offline. More specifically, if no response is received from the ECU 10 until a predetermined determination time DT1 has elapsed from the time at which a request by the rewriting device 11 is sent to the ECU 10, the offline determining part 31 determines that communication is offline. The request may be a request for the deleting time DT, a request for deleting operation, or a request for the result of the deleting operation.

Similarly, if no response is received from the ECU 10 until a predetermined determination time WT1 has elapsed from the time at which a request by the rewriting device 11 is sent to the ECU 10, the offline determining part 31 determines that communication is offline. The request may be a request for the writing time WT, a request for writing operation, or a request for the result of the writing operation. The value of the determination time WT1 may be consistent with or different from that of the determination time DT1.

Figure 2:
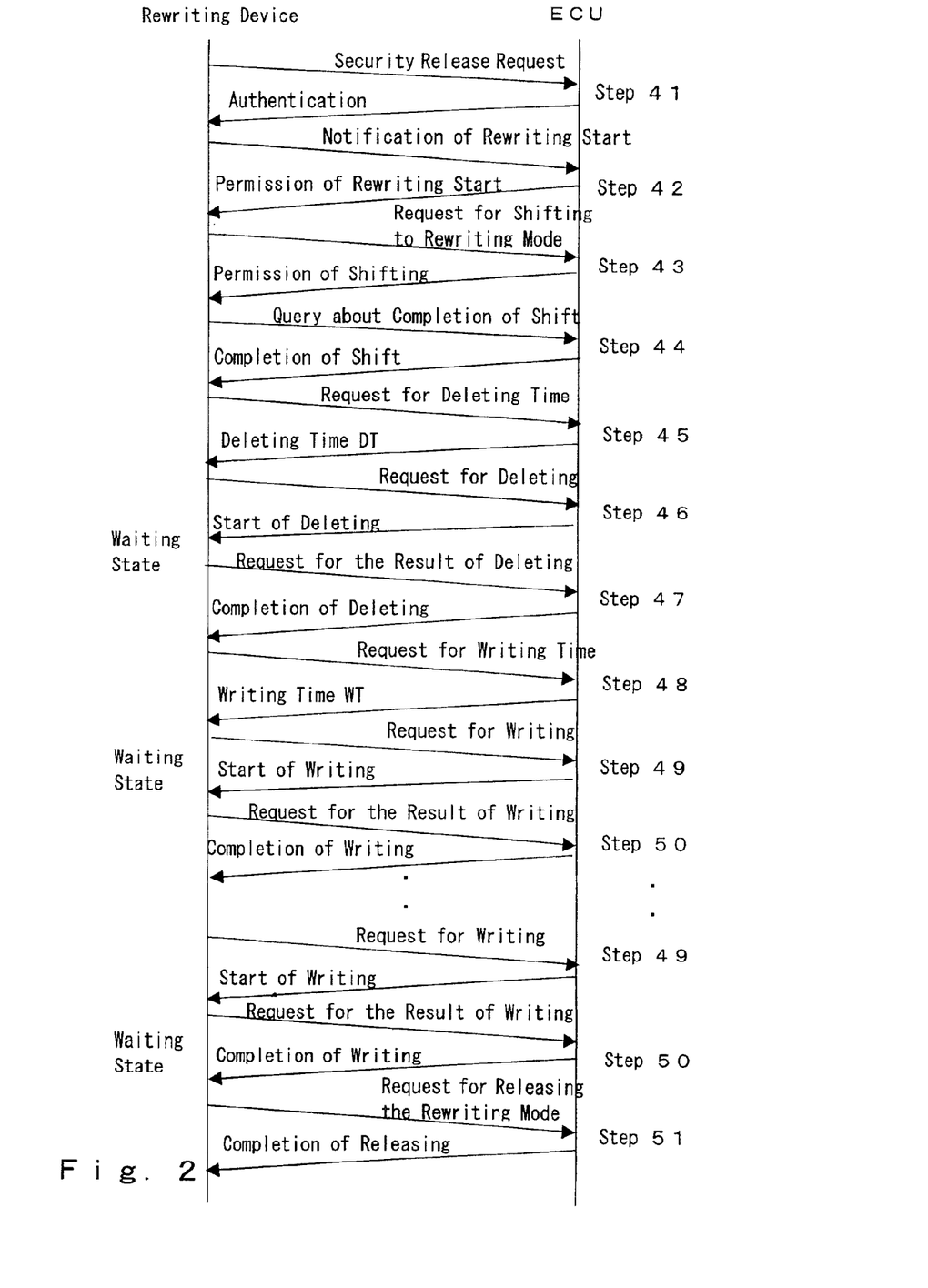
FIG. 2 shows an operational procedure of the rewriting system in one embodiment of the invention.

FIG. 2 shows rewriting operation according to the rewriting system shown in FIG. 1. The rewriting operation is initiated, for example, by operating the rewriting device 11 after it has been connected to the ECU 10. Alternatively, the rewriting operation may be initiated by operating the ECU 10.

At step 41, the security release requesting part 20 of the rewriting device 11 sends a signal to the ECU 10 indicative of a request for releasing security. The ECU 10 responds to the signal to invoke the authentication part 33. The authentication part 33 initiates an authentication process for confirming that the authorized rewriting device is connected.

The authentication process will be carried out in an arbitrary manner. For example, the rewriting device 11 and the ECU 10 have security functions, respectively. The rewriting device 11 calculates its own function value for a given number and sends the calculated value to the ECU 10. On the other hand, the ECU 10 calculates its own function value for the same number. The ECU 10 compares the value calculated by itself with the value received from the rewriting device 11. The ECU 10 determines that the rewriting device is authentic if the two values are the same. The ECU 10 sends a signal to the rewriting device 11 indicative of a permission of rewriting. Thus, the security is released.

If the ECU 10 authenticates the rewriting device 11 and permits it to rewrite to the ROM 16, the process proceeds to step 42. The rewriting initialization part 21 of the rewriting device 11 sends a signal to the ECU 10 indicative of start of rewriting. The initialization part 34 of the ECU 10 returns a signal indicative of a permission of rewriting when ready for rewriting.

At step 43, the rewriting device 11 sends a request to the ECU 10 for shifting to a rewriting operation mode. The initialization part 34 of the ECU 10 executes a process of shifting to the rewriting operation mode. At step 44, the rewriting initialization part 21 of the rewriting device 11 queries the ECU 10 if the shift has been completed. If the shift has been completed, the rewriting initialization part 34 of the ECU 10 sends a signal to the rewriting device 11 indicative of completion of the shift.

At step 45, the deleting time acquiring part 22 of the rewriting device 11 requests the time necessary to delete the program P1. In response to the request, the deleting time calculating part 37 of the ECU 10 calculates the deleting time DT and sends it to the rewriting device 11. The deleting time acquiring part 22 sets the acquired deleting time DT in the waiting time DT2. At step 46, the deleting requesting part 23 of the rewriting device 11 requests the ECU 10 to delete the program P1. In response to the request, the deleting part 35 of the ECU 10 sends a signal indicative of start of deleting operation.

When receiving the signal indicative of start of deleting operation, the rewriting device 11 enters a waiting state. The rewriting device 11 waits until the waiting time DT2 has elapsed. Alternatively, the elapsed time of the waiting time DT2 may be measured from the time at which the request for deleting operation is sent. For the waiting time DT2, the deleting operation of the program P1 is performed by the deleting part 35 of the ECU 10.

When the waiting time DT2 has elapsed, the deleting result requesting part 25 of the rewriting device 11 requests the result of the deleting operation (step 47). When the deleting operation of the program P1 has been completed, the deleting part 35 of the ECU 10 sends a signal to the rewriting device 11 indicative of completion of the deleting operation.

In the rewriting device 11, the new program P2 has been prepared by the data block assembling part 30 as data blocks. Assembling of the data blocks from the program P2 is typically performed before the security release request or the rewriting start signal is sent to the ECU 10. Alternatively, it may be performed immediately before step 47 or 48.

At step 48, the writing time acquiring part 26 of the rewriting device 11 requests the time necessary to write the new program P2. In response to the request, the writing time calculating part 38 of the ECU 10 calculates the writing time WT and sends it to the rewriting device 11. The writing time acquiring part 26 sets the writing time WT in the waiting time WT2.

At step 49, the writing requesting part 27 of the rewriting device 11 transfers a data block including a partial program code of the new program P2 to the ECU 10 together with a signal indicative of a request for writing operation. In response to the request, the writing part 36 of the ECU 10 sends a signal to the rewriting device 11 indicative of start of writing operation. The writing part 36 writes the partial program code included in the data block to the ROM 16. The partial program code is written in an address of the ROM 16 that is indicated by the address field of the data block. A check mechanism may be provided for determining whether the address value in the address field of the data block is included in addresses of data deleted by the deleting part 35.

When receiving the signal indicative of start of writing operation, the rewriting device 11 enters a waiting state. The rewriting device 11 waits until the waiting time WT2 has elapsed. Alternatively, the elapsed time of the waiting time WT2 may be measured from the time at which the request for writing operation is sent. For the waiting time WT2, writing of the program P2 is performed by the writing part 36 of the ECU 10.

When the waiting time WT2 has elapsed, the writing result requesting part 29 of the rewriting device 11 requests the result of the writing operation (step 50). When the writing operation of the partial program code of the program P2 has been completed, the writing part 36 of the ECU 10 sends a signal to the rewriting device 11 indicative of completion of the writing operation.

The writing requesting part 27 transfers a next data block to the ECU 10 if the completion signal indicates a normal end. The steps 49 and 50 are repeated until all the program code of the program P2 is written into the ROM 16. When writing of all the program code has been completed, the writing requesting part 27 requests the ECU 10 to release the rewriting operation mode (step 51). In response to the request, the writing part 36 releases the rewriting operation mode.

Figure 3A:
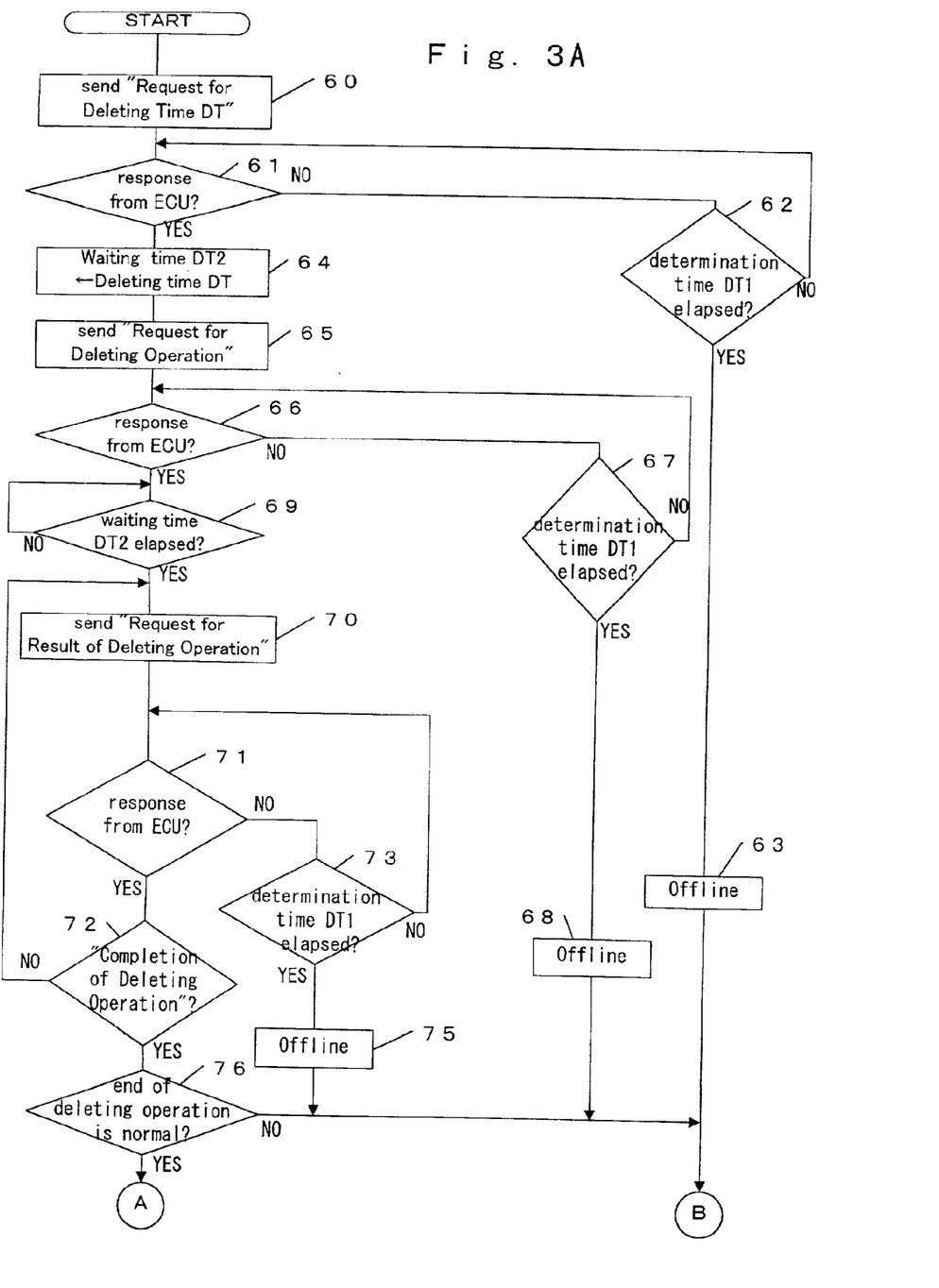
FIG. 3 is a flow chart showing deleting and writing operation in a rewriting device in one embodiment of the invention.

FIGS. 3 is a flow chart of deleting and writing operation carried out in the rewriting device 11. At step 60, the rewriting device 11 sends a signal indicative of a request for the deleting time to the ECU 10. When the deleting time DT is received from the ECU (step 61), the deleting time DT is set in the waiting time DT2 (step 64). The rewriting device 11 sends a signal to the ECU 10 indicative of a request for deleting operation (step 65).

If there is no response from the ECU 10 at step 61, it is determined whether the predetermined determination time DT1 (for example, 30 milliseconds) has elapsed from the time at which the request is sent at step 60 (step 62). Similarly, if there is no response from the ECU 10 at step 66, it is determined whether the predetermined determination time DT1 has elapsed from the time at which the request is sent at step 65 (step 67). If the determination time DT1 has not elapsed, the process returns to steps 61 and 66, respectively, and the rewriting device 11 waits a response from the ECU 10 again. If the determination time DT1 has elapsed, it is determined that communication between the rewriting device 11 and the ECU 10 is offline (steps 63 and 68).

If there is a response from the ECU 10 at step 66, the process proceeds to step 69. At step 69, the rewriting device 11 waits until the waiting time DT2 (for example, 400 milliseconds) has elapsed from the time at which the response is received at step 66. When the waiting time DT2 has elapsed, the rewriting device sends a signal to the ECU 10 indicative of a request for the result of the deleting operation (step 70). If there is a response from the ECU 10 (step 71), it is checked whether the response indicates completion of the deleting operation (step 72). If the response indicates the completion of the deleting operation, the process proceeds to step 76. If the deleting operation is in progress, the process returns to step 70, and the signal indicative of a request for the result of the deleting operation is sent to the ECU 10 again. Alternatively, the return to step 70 may be made after a predetermined period.

At step 71, if there is no response from the ECU 10, it is checked whether the determination time DT1 has elapsed from the time at which the request is sent at step 70 (step 73). If the determination time DT1 has not elapsed, the process returns to step 71, and the rewriting device 11 waits a response from the ECU 10 again. If the determination time DT1 has elapsed, it is determined that the communication is offline (step 75).

Thus, by waiting until the waiting time DT2 has elapsed from the start of deleting operation, an erroneous determination of offline due to a busy state of the ECU can be avoided. In addition, the efficiency of deleting operation can be improved because the deleting time DT according to the specification of the ROM is set in the waiting time DT2.

Figure 3B:
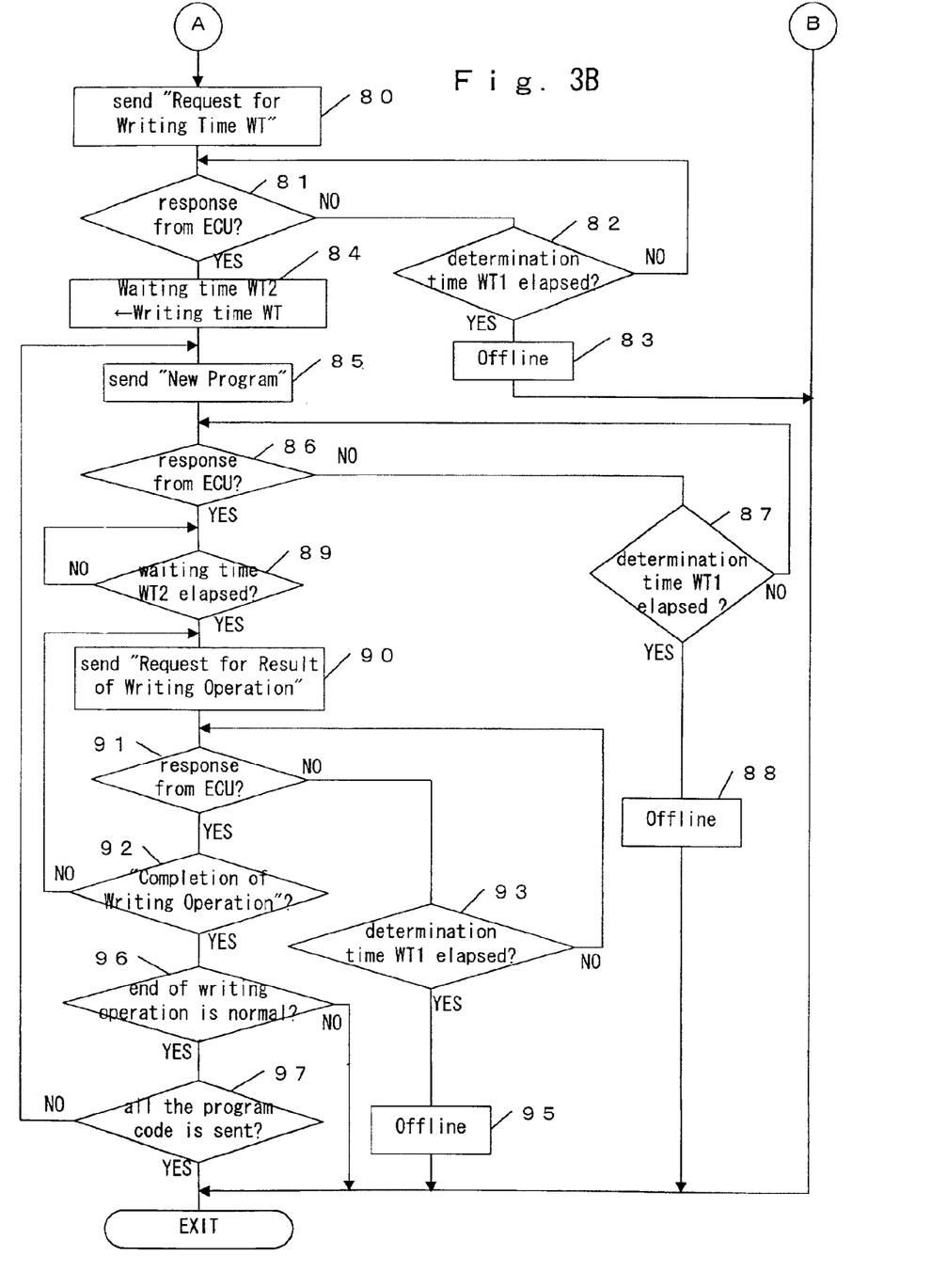

At step 76, the process proceeds to step 80 in FIG. 3B if the deleting operation ends normally. If the deleting operation does not end normally, the process exits from this routine.

At step 80, a signal indicative of a request for the writing time is sent to the ECU 10. The rewriting device receives the writing time WT and sets it in the waiting time WT2 (step 84). The process proceeds to step 85, and a data block including a partial program code of the new program P2 is transferred to the ECU 10.

If there is no response from the ECU 10 at step 81, it is determined whether the predetermined determination time WT1 (for example, 30 milliseconds) has elapsed from the time at which the request is sent at step 80 (step 82). Similarly, if there is no response from the ECU 10 at step 86, it is determined whether the predetermined determination time WT1 has elapsed from the time at which the request is sent at step 85 (step 87). If the determination time WT1 has not elapsed, the process returns to steps 81 and 86, respectively, and rewriting device 11 waits a response from the ECU 10 again. If the determination time WT1 has elapsed, it is determined that the communication is offline (steps 83 and 88).

If there is a response from the ECU 10 at step 86, the process proceeds to step 89. At step 89, the rewriting device 11 enters a waiting state and waits until the waiting time WT2 (for example, 40 milliseconds) has elapsed. When the waiting time WT2 has elapsed, the rewriting device sends a signal to the ECU 10 indicative of a request for the result of the writing operation (step 90). If there is a response to the request, it is checked whether the response indicates completion of the writing operation (step 92). If the response indicates completion of the writing operation, the process proceeds to step 96. If the writing operation is in progress, the process returns to step 90, and the rewriting device 11 sends the signal indicative of a request for the result of the writing operation to the ECU 10 again. The return to step 90 may be made after a predetermined period.

If there is no response from the ECU 10 at step 91, it is checked whether the determination time WT1 has elapsed from the time at which the request is sent at step 90 (step 93). If the determination time WT1 has not elapsed, the process returns to step 91, and the rewriting device waits a response from the ECU 10 again. If there is no response from the ECU until the determination time WT1 has elapsed, the rewriting device 11 determines that the communication is offline (step 95).

Thus, by waiting until the waiting time WT2 has elapsed from the start of writing operation, an erroneous determination of offline due to a busy state of the ECU can be avoided. In addition, the efficiency of writing operation can be improved because the writing time WT according to the specification of the ROM is set in the waiting time WT2.

At step 96, if it is determined that the writing operation ends normally, the process proceeds to step 97. If all the program code of the new program P2 has not been sent to the ECU 10, the process returns to step 80 to send a next data block. If all the program code of the new program P2 is sent to the ECU 10, the process exits from this routine.

Figure 4:
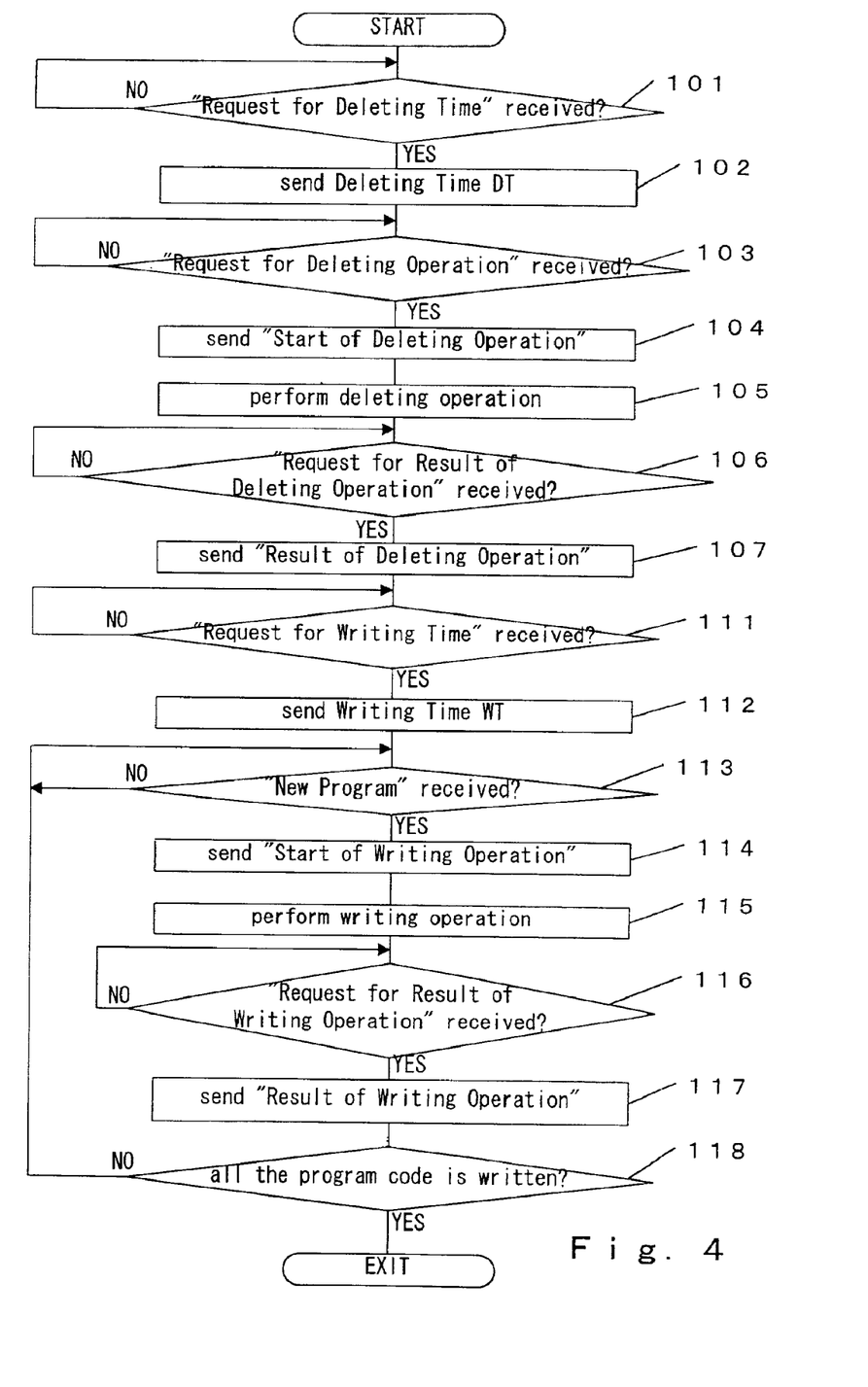
FIG. 4 is a flow chart showing deleting and writing operation in a vehicle controller in one embodiment of the invention.

FIG. 4 shows a flow chart of deleting and writing operation carried out by the ECU 10. If a signal indicative of a request for the deleting time is received at step 101, the deleting time DT is sent to the rewriting device 11 (step 102). If a signal indicative of a request for deleting operation is received at step 103, a signal indicative of start of the deleting operation is sent to the rewriting device 11 (step 104), and deleting operation is performed (step 105). When a signal indicative of a request for the result of the deleting operation is received from the rewriting device 11 (step 106), a signal indicative of the result of the deleting operation is sent to the rewriting device 11 (step 107). The result signal shows the state of the deleting operation, in such a manner that a value "1" indicates completion of the deleting operation and a value "0" indicates that the deleting operation is in progress.

In a similar way, if a signal indicative of a request for the writing time is received from the rewriting device 11 (step 111), the writing time WT is calculated and is sent to the rewriting device 11 (step 112). If a data block of the new program P2 is received from the rewriting device 11 at step 113, a signal indicative of start of writing operation is sent to the rewriting device 11 (step 114), and a partial program code included in the received data block is written into the ROM 16 (step 115). If a signal indicative of a request for the result of the writing operation is received from the rewriting device 11 (step 116), the result of the writing operation is sent to the rewriting device 11 (step 117). The writing result signal shows the state of the writing operation, in such a manner that a value "1" indicates completion of the writing operation and a value "0" indicates that the writing operation is in progress. The transfer of the new program P2 from the rewriting device 11 to the ECU 10 is executed for each data block. Therefore, steps 113 through 117 are repeated until all the data blocks of the new program P2 are received (step 118).

What is claimed is:

1. A device for deleting data stored in a memory of a vehicle controller:

the device being capable of communicating with the vehicle controller and configured to:

acquire from the vehicle controller a deleting time that is necessary to delete the data stored in the memory;

set the acquired deleting time in a predetermined waiting time; and wait without communicating with the vehicle controller until the predetermined waiting time elapses from the time at which a signal for requesting deletion of the data in the memory is sent to the vehicle controller or from the time at which a signal indicative of start of deleting operation of the data is receive from the vehicle controller.

2. A device for deleting data stored in a memory of a vehicle controller:

the device being capable of communicating with the vehicle controller and configured to wait without communicating with the vehicle controller until a predetermined waiting time elapses from the time at which a signal for requesting deletion of the data in the memory is sent to the vehicle controller or from the time at which a signal indicative of start of deleting operation of the data is receive from the vehicle controller, wherein the predetermined waiting time is a deleting time necessary to delete the data stored in the memory, wherein the deleting time is calculated based on the size of the data and the specification of the memory.

3. A rewriting device for rewriting data stored in a memory of a vehicle controller with new data;

the rewriting device being capable of communicating with the vehicle controller and configured to:

acquire from the vehicle controller a writing time that is necessary to write the new data into the memory;

set the acquired writing time in a predetermined waiting time; and wait without communicating with the vehicle controller until a predetermined waiting time elapses from the time at which a signal for requesting the vehicle controller to write the new data into the memory is sent to the vehicle controller or from the time at which a signal indicative of start of writing operation of the new data is received from the vehicle controller.

4. A rewriting device for rewriting data stored in a memory of a vehicle controller with new data, the rewriting device being capable of communicating with the vehicle controller and configured to wait without communicating with the vehicle controller until a predetermined waiting time elapses from the time at which a signal for requesting the vehicle controller to write the new data into the memory is sent to the vehicle controller or from the time at which a signal indicative of start of writing operation of the new data is received from the vehicle controller, wherein the predetermined waiting time is a writing time necessary to write the new data into the memory, wherein the writing time is calculated based on the size of the new data and the specification of the memory.

5. A rewriting system for rewriting data stored in a memory of a vehicle controller with new data, the system comprising:

a rewriting device capable of communicating with the vehicle controller, the rewriting device configured to wait without communicating with the vehicle controller until a predetermined waiting time elapses from the time at which a signal for requesting the vehicle controller to delete the data or write the new data in the nonvolatile memory is sent, or from the time at which a signal indicative of start of deleting operation of the data or writing operation of the new data is received, wherein the predetermined waiting time for the deleting operation is a deleting time necessary to delete the data stored in the memory, wherein the vehicle controller is configured to calculate the deleting time necessary to delete the data in the memory and send the deleting time to the rewriting device.

6. A rewriting system for rewriting data stored in a memory of a vehicle controller with new data, the system comprising:

a rewriting device capable of communicating with the vehicle controller, the rewriting device configured to wait without communicating with the vehicle controller until a predetermined waiting time elapses from the time at which a signal for requesting the vehicle controller to delete the data or write the new data in the nonvolatile memory is sent, or from the time at which a signal indicative of start of deleting operation of the data or writing operation of the new data is received, wherein the predetermined waiting time for the writing operation is a writing time necessary to write the new data into the memory, wherein the vehicle controller is configured to calculate the writing time necessary to write the new data into the memory and send the writing time to the rewriting device.

7. A rewriting system for rewriting data stored in a memory of a vehicle controller with new data, the system comprising:

a rewriting device capable of communicating with the vehicle controller, the rewriting device configured to wait without communicating with the vehicle controller until a predetermined waiting time elapses from the time at which signal for requesting the vehicle controller to delete the data or write the new data in the nonvolatile memory is sent or from the time at which a signal indicative of start of deleting operation of the data or writing operation of the new data is received, wherein the predetermined waiting time for the deleting operation is a deleting time necessary to delete the data stored in the memory and the predetermined waiting time for the writing operation is a writing time necessary to write the new data into the memory, wherein the deleting time and the writing time are calculated in accordance with the specification of the memory, respectively.

8. A method for writing data stored in a memo of a vehicle controller with new data via a device capable of communicating with the vehicle controller, the method comprising:

calculating a writing time necessary to write the new data into the memory;

setting the writing time in a waiting time;

sending a request asking the vehicle controller to write the new data into the memory; and at the device, waiting until a predetermined waiting time elapses from the time at which the request is sent;

wherein, during the waiting time, there is no exchange of message between the vehicle controller and the device.

9. The method of claim 8, further comprising:

when the waiting time has elapsed, sending a request for the result of the writing operation to the vehicle controller.

* * * * *